Patented May 9, 1950

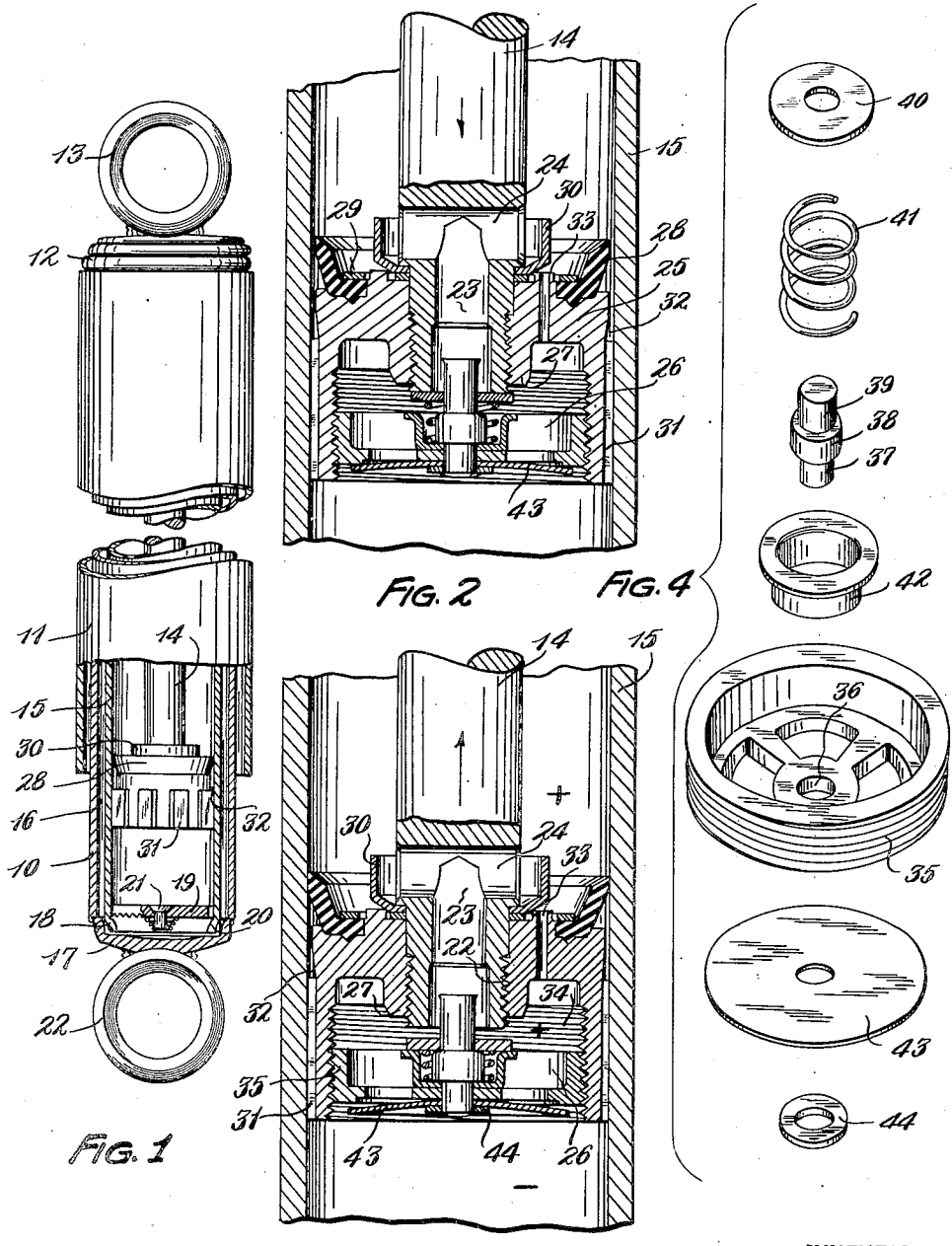

2,507,268

UNITED STATES PATENT OFFICE 2,507,268

SHOCK ABSORBER

William G. Patriquin, Cleveland, Ohio, assignor to The Gabriel Company, Cleveland, Ohio, a corporation of Ohio Application June 15, 1948, Serial No. 33,194

6 Claims. (Cl. 188—88)

1

This invention relates to a shock absorber and particularly to a direct acting fluid shock absorber. Inasmuch as the invention is particularly useful when employed in a direct double acting hydraulic shock absorber it will be so described herein by way of illustration but not by way of limitation.

An object of the invention is to provide an improved fluid shock absorber which in operation will be efficient and quiet.

In a direct double acting hydraulic shock absorber wherein the working cylinder at one end is in communication with a reservoir, there is a tendency during the recoil stroke of the shock absorber piston away from said one end to create a negative pressure in the working cylinder behind the piston, especially if the oil does not flow sufficiently rapidly from the reservoir into the working cylinder behind the piston. The negative pressure behind the piston allows the entrained air or gas to readily separate from the oil and to accumulate adjacent to the piston. The consequence is, that when the recoil valve in the piston opens upon a predetermined pressure being built up in front of the piston, the accumulated air or gas rushes through the piston with a swishing noise. Also the separation of the air or gas from the oil behind the piston and the rushing of the separated air or gas through the piston when the recoil valve opens tends to create in the oil bubbles, foam or an emulsified condition.

Another object of the invention is to provide a hydraulic shock absorber of the character referred to which is quiet in operation, reduces to a minimum any tendency to create a swishing noise during the recoil stroke and lessens the likelihood of the formation of bubbles, foam or an emulsified condition in the oil contained in the shock absorber.

A further object is to provide a hydraulic shock absorber of the type referred to which is provided with a two-stage recoil valving arrangement to accomplish the objects hereinbefore stated.

Additional objects and advantages not hereinbefore referred to will become apparent during the detailed description of an embodiment of the invention which is to follow.

Referring to the accompanying drawing illustrating said embodiment of the invention, Fig. 1 is a view, partly in elevation and partly in longitudinal section, of a direct double acting hydraulic shock absorber embodying the invention.

2

Fig. 2 is a fragmentary sectional view, on a larger scale than Fig. 1, through the working cylinder of the shock absorber and the piston and shows the relationship of the parts during the impact or down stroke of the piston.

Fig. 3 is a view similar to Fig. 2 but shows the relationship of the parts during the recoil or upward stroke of the piston and after both recoil valves of the two-stage recoil valving arrangement have opened, and Fig. 4 is an exploded perspective of the two-stage recoil valving arrangement carried by the piston.

The direct double acting hydraulic shock absorber shown in the drawings, particularly with reference to Fig. 1, comprises a tubular casing 10 which has telescoping movement within and relative to a tubular outer guard member 11, the lower end of which is open while the upper end thereof is closed by a closure member 12. The closure member 12 has secured to it on its outer side an attaching eye 13 while on its inner side it has secured to it the piston rod 14 as will be well understood in the art. A working cylinder 15 is arranged within the casing 10 in radially spaced concentric relationship to the casing to provide between the casing and the cylinder an annular reservoir space 16. The upper ends of the casing 10 and the cylinder 15 are interconnected and closed by suitable closure means not shown since it forms no part of the present invention and is well understood in the art. The piston rod 14 slidably extends through the closure means referred to and it will be understood that said closure means is so constituted as to adequately seal the upper end of the casing and the upper end of the cylinder against the escape of oil therefrom, particularly as respects the working cylinder.

The lower end of the casing 10 is secured to and is closed by an upwardly facing cup-shaped closure member 17 which may be connected to the casing 10 by any suitable means such as by welding as is well understood in the art. The cylinder 15 extends into the cup-shaped closure member and is provided at its lower end with an inward flare indicated at 18. Above the flare 18 the working cylinder is closed by a closure plate 19 secured therein and provided with a suitable fixed orifice or with a valve controlled orifice through which the oil can flow from the working cylinder into the space between the closure plate 19 and the closure member 17 during the impact or downward stroke of the piston in the cylinder.

The closure member 17 is provided internally with a plurality of circularly spaced grooves 20 which place the reservoir 16 in communication with the space between the closure member 17 and the closure plate 19. The closure plate 19 is shown as provided with a spring-pressed replenishing valve 21 which opens during the recoil stroke to provide a relatively rapid flow of oil from the reservoir 16 into the working cylinder. The closure member 17 on its outer side is provided with an attaching eye 22. The construction of the shock absorber as thus far set forth is well known in the art and per se forms no part of the present invention.

It will be understood that the shock absorber is mounted in operative position on a vehicle such as a motor vehicle by means of the attaching eyes 13 and 22, such that when the vehicle springs are compressed, due to the impact of the wheels with an obstruction, the piston rod 14 and the piston carried thereby and the guard member 11 move downwardly relative to the casing 10 and cylinder 15.

It will also be understood that as the vehicle springs expand or recoil after being thus compressed, the piston rod 14 and the piston carried thereby together with the guard member 11 move upwardly relative to the casing 10 and cylinder 15. The piston which is attached to the lower or inner end of the piston rod 14 may take various forms and the form shown herein is merely for purposes of illustration.

The lower end of the piston rod is threaded as indicated at 22 and said lower end of the rod is provided with a longitudinally extending bore or passage 23 that communicates at its upper end, as viewed in the drawing, with a diametrically extending bore or passage 24. The piston body 25 is provided with a central threaded bore that communicates with an enlarged counterbore or chamber 26. The threaded end 22 of the piston rod 14 is screwed into the threaded central bore of the piston a distance such that the inner or lower end of the piston rod projects slightly below a central boss 27 formed on the piston body 25 within the counterbore 26. The upper end of the piston body 25, as viewed in the drawing, terminates when assembled in the piston rod below the diametral bore or passage 24 in the piston rod and said upper end of the piston body mounts in this instance a cup-shaped packing 28 which sealingly contacts the cylinder 15. The packing 28 is held in position by a clamping disk 29 secured to the piston body while a cup-shaped member 30 is held between the disk 29 and a shoulder of the piston rod and has its annular side wall surrounding the piston rod at the exit ends of the bore 24. The purpose of the cup-shaped member 30 is to prevent bottoming of the piston against the sealing means at the upper end of the working cylinder which might occur during the recoil stroke and which might close off the diametral bore 24.

The periphery of the piston body 25 is provided with a plurality of axially extending circumferentially spaced grooves 31 which extend from the lower end of the piston body upwardly thereof to an annular space 32 provided between the piston body and the cylinder at the upper end of the body and shown as of less depth than the grooves 31. The packing 28 overlies the annular space 32 and during the recoil or upward stroke of the piston as indicated by the arrow in Fig. 3, is pressed firmly by the oil pressure against the cylinder 15 to seal said space 32 and said grooves 31 against the passage of oil therethrough. During the downward or impact stroke of the piston as indicated by the arrow in Fig. 2 the pressure of the oil in the grooves 31 and annular space 32 will be sufficient to flex the packing 28 slightly away from the cylinder wall and to allow a flow of oil from the underside of the piston to the upper side thereof through the grooves 31 and the annular space 32. The piston body 25 is provided with one or more bleed passages 33 extending from the upper end of the piston through the body to the counterbore 26.

The two-stage recoil valve arrangement embodying the present invention and carried by the piston body will now be described.

The counterbore 26 of the piston body is threaded as indicated at 34 so that an externally threaded cup-shaped member 35 can be screwed into the counterbore. The bottom of the cup-shaped member 35 is provided with openings and ribs as clearly indicated in Fig. 4 and including a central opening 36. This central opening 36 has secured therein a post or pin 37 which intermediate its ends is provided with an enlarged portion 38 beyond which is a portion 39 that extends into the bore 23 in the piston rod 14. A rigid plate recoil valve 40 is slidable on the portion 39 of the pin 37 and is normally held seated against the lower end of the piston rod 14 by means of a recoil valve spring 41 that surrounds the portion 39 of the pin or post 37 and has one end abutting the valve plate 40 and its other end seated in the flanged cup-shaped spring housing member 42 which is clamped between the portion 38 of the pin 37 and the bottom of the cup-shaped member 35 adjacent the central opening 36 thereof.

The pin or post 37 intermediate the lower side of the bottom of the cup-shaped member 35 and a head on said pin mounts a flexible disk valve 43, a washer 44 being interposed between the head of the pin 37 and the flexible disk valve 43. The flexible disk valve 43 normally is in the position shown in Fig. 2 at which time it sealingly separates the counterbore 26 from the working cylinder beneath the piston.

In order to clearly explain the invention and the advantages derived therefrom the operation of the shock absorber will be set forth, first with respect to the impact stroke of the piston and then with respect to the recoil stroke thereof. Assuming that the working cylinder and the reservoir are properly supplied with oil and that the shock absorber is operatively mounted on a vehicle and that the wheels of the latter have impacted an obstruction to compress the vehicle springs and cause a downward or impact stroke of the piston in the cylinder 15, as indicated by the arrow in Fig. 2, it will be seen that during this stroke the rigid recoil valve plate 40 is seated as is also the flexible valve disk 43 and hence no oil flows from the lower side of the piston through the counterbore 26 and the bores or passages 23 and 24 in the piston rod to the upper side of the piston. However, during this downward or impact stroke oil can flow from the lower side of the piston through the peripheral grooves 31 and annular space 32 past the packing 28 to the upper side of the piston. Also during the downward or impact stroke oil will be forced from the working cylinder through the fixed orifice in the closure plate 19 and into the reservoir 16, particularly the oil which is displaced by the increased volumetric area of the entering piston rod 14. The features of operation just referred to will be well understood in the art.

Now assuming that the vehicle springs have completed their compression and are now recoiling or expanding, it will be understood that the piston moves in its recoil or upward stroke, as indicated by the arrow in Fig. 3. The start of the recoil stroke of the piston causes the packing 28 to be pressed by hydraulic pressure against the working cylinder so that oil cannot flow from the upper side of the piston to the lower side thereof past the packing and through the annular space 32 and peripheral grooves 31. Also at the commencement of the recoil stroke the recoil valve 40 will be held closed by the spring 41 and hence oil cannot flow through the bores or passages 24 and 23 in the piston rod into the counterbore or chamber 26 until the valve 40 is unseated against the action of the spring 41. At the commencement of the recoil stroke the hydraulic pressure will not be sufficient to so unseat the valve 40. During the first portion of the recoil stroke oil will be free to flow of course from the upper side of the piston through the bleed passage 33 into the counterbore or chamber 26 but until the disk valve 43 is flexed open this oil will not be free to flow from the counterbore 26 to the lower side of the piston. As the piston moves upwardly in its recoil stroke the replenishing valve 21 in the plate 19 opens and allows oil to flow from the reservoir 16 into the working cylinder below or behind the piston. However the volume area of the working cylinder below or behind the piston is increasing rapidly and the oil may not flow into this portion of the working cylinder from the reservoir sufficiently rapidly to completely fill said portion and thus a negative pressure may be created in the working cylinder below the piston. The negative pressure in the working cylinder below the piston allows air or gas entrained in the oil to separate from the oil readily and this separated air or gas ordinarily would tend to accumulate in the counterbore 26 adjacent to the recoil valve 40. The result would be that when the recoil valve opened the accumulated air or gas would rush through the bores or passages 23 and 24 in the piston rod 14 with a swishing or hissing noise and with a resultant formation of bubbles or foam in the oil or an emulsification thereof.

It will be understood that during the recoil stroke of the piston the pressure in the working cylinder above the piston is a positive pressure. In a shock absorber constructed in accordance with the present invention this positive pressure is also present in the counterbore 26 of the piston during the recoil stroke, due to the bleed passage 33 and the valve disk 43. The disk 43 will remain closed during the recoil stroke until the positive pressure in the counterbore 26 is such that the disk will be flexed from its closed or seated position as shown in Fig. 2 into the open position indicated in Fig. 3. This flexure of the disk valve 43 toward open position will be gradual and will allow any separated air or gas in the working cylinder below the piston to gradually enter the counterbore 26 and also the differential in pressure between the counterbore 26 and the working cylinder below the piston will have a tendency to slowly equalize. Consequently when the positive pressure above the cylinder and in the passages 24 and 23 attains to the predetermined pressure sufficient to open the valve 40 there will be no accumulation of separated air or gas to rush through these passages with a hissing or swishing noise and with a turbulent action that would tend to create bubbles or foam in the oil.

In other words, the disk valve 43 functions to maintain a positive pressure in the counterbore 26 during the recoil stroke and therefore air or gas separating from the oil below the piston and getting into the counterbore 26 would tend to again be entrained in the oil in the counterbore and not to accumulate in an air pocket adjacent the valve 40.

From the foregoing description it will be clear that the shock absorber embodying the present invention will be quiet in operation, particularly during the recoil stroke and the tendency to create bubbles or foam in the oil will be reduced to a minimum. Consequently the operating efficiency of the shock absorber will be materially increased by the employment of the two-stage recoil valve arrangement herein described.

Although a preferred embodiment of the invention has been illustrated and described herein it will be understood that the invention is susceptible of various modifications and adaptations within the scope of the appended claims.

Having thus described my invention, I claim:

1. A valve mechanism for a hydraulic device of the type having a working cylinder, a piston movable in said cylinder in opposite directions and having a passage therethrough and a bleed passage extending from one end of said piston to said first named passage intermediate the ends of the latter; said valve mechanism comprising a valve located intermediate the ends of said piston and normally closing said passage therethrough, and valve means carried by said piston at the other end thereof in spaced relationship to said valve and normally closing said passage, said valve and said valve means being adapted upon movement of said piston in one direction to open successively, said valve means first opening under relatively low hydraulic pressure and said valve then opening under relatively high hydraulic pressure said valve means and said bleed passage during movement of said piston in said one direction and prior to the opening of said valve maintaining a positive hydraulic pressure in the space between said valve means and said valve wherefore air in the hydraulic medium does not separate therefrom and collect in said space to rush past said valve with a swishing noise when the latter opens.

2. A valve mechanism as defined in claim 1 and wherein said valve means is a flexible disk.

3. A valve mechanism as defined in claim 1 and wherein said passage through said piston intermediate said valve and said valve means is in the form of an enlarged chamber with said bleed passage in communication with said chamber.

4. A valve mechanism as defined in claim 1 and wherein said valve is a rigid plate and said valve means is a flexible disk while a spring acts on said valve to normally maintain the latter in seated position.

5. A valve mechanism for a hydraulic device of the type having a working cylinder, a piston movable in said cylinder in opposite directions and provided with bore means extending from end to end of said piston and including a counterbore located at one end of the piston, said piston also being provided with a bleed passage extending from the other end of the piston and communicating with said counterbore; said mechanism comprising valve means at said one end of the piston and normally interrupting communication between said counterbore and said cylinder, and a valve carried by said piston and normally interrupting communication between said counterbore and the other end of the piston said valve and said valve means being adapted upon movement of said piston in one direction to open successively, said valve means first opening under relatively low positive hydraulic pressure and said valve then opening under relatively high hydraulic pressure, said valve means in conjunction with said bleed passage acting during movement of said piston in one direction to maintain a positive pressure in said counterbore prior to the opening of said valve, wherefore air in the hydraulic medium does not separate therefrom and collect in said counterbore to rush with a swishing noise past said valve when the latter opens.

6. A valve mechanism as defined in claim 5 and wherein said valve means is a flexible disk while said valve is a rigid plate, and wherein said counterbore is provided with a post on which said plate is slidable, and a spring is located in said counterbore and engages said plate and normally maintains the same in seated position.

WILLIAM G. PATRIQUIN.

REFERENCES CITED

The following references are of record in the file of this patent:

UNITED STATES PATENTS

| Number | Name | Date |
|---|---|---|
| 2,223,337 | Hatfield | Nov. 26, 1940 |
| 2,351,662 | Christofel | June 20, 1944 |